United States Patent
Betge-Brezetz et al.

(10) Patent No.: US 8,639,795 B2
(45) Date of Patent: Jan. 28, 2014

(54) ADAPTIVE DATA ACQUISITION FOR A NETWORK OR SERVICES MANAGEMENT SYSTEM

(75) Inventors: Stéphane Betge-Brezetz, Paris (FR); Olivier Martinot, Draveil (FR); Emmanuel Marilly, Antony (FR)

(73) Assignee: Alcatel Lucent, Paris (FR)

( * ) Notice: Subject to any disclaimer, the term of this patent is extended or adjusted under 35 U.S.C. 154(b) by 1928 days.

(21) Appl. No.: 10/293,306

(22) Filed: Nov. 14, 2002

(65) Prior Publication Data

US 2003/0097440 A1 May 22, 2003

(30) Foreign Application Priority Data

Nov. 16, 2001 (FR) .................................. 01 14864

(51) Int. Cl.
- *G06F 15/16* (2006.01)
- *G06F 15/173* (2006.01)
- *G06F 15/177* (2006.01)

(52) U.S. Cl.
USPC ............ 709/224; 709/203; 709/221; 709/235

(58) Field of Classification Search
USPC .......................... 709/223, 224, 202, 221, 227; 715/733–736; 719/317; 713/100; 702/188
See application file for complete search history.

(56) References Cited

U.S. PATENT DOCUMENTS

| | | | |
|---|---|---|---|
| 4,967,381 A * | 10/1990 | Lane et al. ........................ 702/81 |
| 5,193,178 A * | 3/1993 | Chillarege et al. .............. 714/25 |
| 5,664,105 A * | 9/1997 | Keisling et al. ................ 709/224 |
| 5,751,964 A * | 5/1998 | Ordanic et al. ................ 709/224 |
| 5,870,692 A * | 2/1999 | Millo ................................. 702/45 |
| 5,872,973 A * | 2/1999 | Mitchell et al. ................ 719/332 |
| 5,878,420 A * | 3/1999 | de la Salle ........................... 1/1 |
| 5,886,643 A * | 3/1999 | Diebboll et al. ............... 709/224 |
| 5,889,954 A * | 3/1999 | Gessel et al. ................... 709/223 |
| 5,892,937 A * | 4/1999 | Caccavale ....................... 711/135 |
| 5,926,463 A * | 7/1999 | Ahearn et al. ................. 370/254 |
| 5,948,063 A * | 9/1999 | Cooper et al. ................. 709/223 |
| 6,021,331 A * | 2/2000 | Cooper et al. ................. 455/507 |
| 6,094,678 A * | 7/2000 | Nethercott et al. ............ 709/220 |
| 6,097,703 A * | 8/2000 | Larsen et al. .................. 370/254 |
| 6,108,782 A * | 8/2000 | Fletcher et al. ................ 713/153 |
| 6,112,241 A * | 8/2000 | Abdelnour et al. ............ 709/224 |
| 6,121,816 A * | 9/2000 | Tonks et al. ................... 327/296 |
| 6,279,037 B1 * | 8/2001 | Tams et al. ..................... 709/224 |
| 6,285,966 B1 * | 9/2001 | Brown et al. .................. 702/188 |

(Continued)

OTHER PUBLICATIONS

Cozzani, Irene and Giordano, Stefano. "A Passive Test and Measurement System: Traffic Sampling for QoS Evaluation," Global Telecommunications Conference, 1998, pp. 1236-1241.*

(Continued)

*Primary Examiner* — Melvin H Pollack
(74) *Attorney, Agent, or Firm* — Wolff & Samson PC

(57) ABSTRACT

A network management system comprising a data acquisition module itself comprising a measurement module for collecting data coming from probes placed on items of network equipment in a network is provided. The data acquisition module forwards the data to a supervisor module, the data being collected as a function of measurement parameters associated with the probes, wherein the data acquisition module further comprises a measurement adaptation module having a module for adding or removing the probes and for modifying the associated measurement parameters as a function of the collected data.

5 Claims, 3 Drawing Sheets

(56) References Cited

U.S. PATENT DOCUMENTS

| | | | |
|---|---|---|---|
| 6,289,017 B1* | 9/2001 | Shani et al. | 370/395.53 |
| 6,321,263 B1* | 11/2001 | Luzzi et al. | 709/224 |
| 6,321,264 B1* | 11/2001 | Fletcher et al. | 709/224 |
| 6,327,620 B1* | 12/2001 | Tams et al. | 709/224 |
| 6,327,677 B1* | 12/2001 | Garg et al. | 714/37 |
| 6,336,138 B1* | 1/2002 | Caswell et al. | 709/223 |
| 6,363,056 B1* | 3/2002 | Beigi et al. | 370/252 |
| 6,363,477 B1* | 3/2002 | Fletcher et al. | 713/151 |
| 6,424,872 B1* | 7/2002 | Glanzer et al. | 700/18 |
| 6,438,591 B1* | 8/2002 | Fehskens et al. | 709/223 |
| 6,473,794 B1* | 10/2002 | Guheen et al. | 709/223 |
| 6,507,804 B1* | 1/2003 | Hala et al. | 702/182 |
| 6,515,968 B1* | 2/2003 | Combar et al. | 370/252 |
| 6,519,321 B2* | 2/2003 | Swale | 379/26.01 |
| 6,519,638 B1* | 2/2003 | Forman et al. | 709/224 |
| 6,611,617 B1* | 8/2003 | Crampton | 382/154 |
| 6,625,648 B1* | 9/2003 | Schwaller et al. | 709/224 |
| 6,675,209 B1* | 1/2004 | Britt | 709/224 |
| 6,689,055 B1* | 2/2004 | Mullen et al. | 600/300 |
| 6,748,434 B2* | 6/2004 | Kavanagh | 709/224 |
| 6,748,446 B2* | 6/2004 | Sato et al. | 709/241 |
| 6,804,701 B2* | 10/2004 | Muret et al. | 709/203 |
| 6,894,972 B1* | 5/2005 | Phaal | 370/229 |
| 6,944,681 B1* | 9/2005 | Christensen et al. | 710/8 |
| 6,952,421 B1* | 10/2005 | Slater | 370/401 |
| 6,975,655 B2* | 12/2005 | Fischer et al. | 370/516 |
| 7,043,560 B2* | 5/2006 | Coulombe et al. | 709/232 |
| 7,143,159 B1* | 11/2006 | Grace et al. | 709/224 |
| 7,539,744 B2* | 5/2009 | Matthews et al. | 709/223 |
| 7,594,009 B2* | 9/2009 | Triulzi et al. | 709/224 |
| 7,594,260 B2* | 9/2009 | Porras et al. | 726/13 |
| 7,660,983 B1* | 2/2010 | Srivastava et al. | 713/163 |
| 7,680,928 B2* | 3/2010 | Lean et al. | 709/224 |
| 7,822,871 B2* | 10/2010 | Stolorz et al. | 709/238 |
| 7,861,084 B2* | 12/2010 | Beuque et al. | 713/175 |
| 7,886,023 B1* | 2/2011 | Johnson | 709/219 |
| 8,145,742 B1* | 3/2012 | Parker et al. | 709/224 |
| 8,219,663 B2* | 7/2012 | Faraldo, II | 709/224 |
| 2001/0001849 A1* | 5/2001 | Felps | 702/66 |
| 2002/0055999 A1* | 5/2002 | Takeda | 709/224 |
| 2002/0099817 A1* | 7/2002 | Abbott et al. | 709/224 |
| 2002/0143920 A1* | 10/2002 | Dev et al. | 709/223 |
| 2002/0143929 A1* | 10/2002 | Maltz et al. | 709/224 |
| 2002/0161536 A1* | 10/2002 | Suh et al. | 702/62 |
| 2002/0169871 A1* | 11/2002 | Cravo de Almeida et al. | 709/224 |
| 2003/0069952 A1* | 4/2003 | Tams et al. | 709/223 |
| 2003/0135593 A1* | 7/2003 | Lee et al. | 709/223 |
| 2005/0027845 A1* | 2/2005 | Secor et al. | 709/223 |
| 2008/0028083 A1* | 1/2008 | Rezvani et al. | 709/229 |
| 2008/0281963 A1* | 11/2008 | Fletcher et al. | 709/224 |
| 2011/0035491 A1* | 2/2011 | Gelvin et al. | 709/224 |
| 2011/0119366 A1* | 5/2011 | Elman et al. | 709/223 |

OTHER PUBLICATIONS

Oliveira, R. and Labetoulle, J. "MANIA—Managing Awareness in Networks Through Intelligent Agents," IEEE Network Operations and Management Symposium (NOMS), vol. 2, Feb. 15-20, 1998, pp. 431-440.*

Ibraheem, S. et al. "Capturing a Qualitative Model of Network Performance and Predictive Behavior," Journal of Network and System Management, vol. 6, Issue 2, 1997, pp. 1-26.*

Brodie, Mark et al. "Optimizing Probe Selection for Fault Localization," 12th International Workshop on Distributed Systems: Operations and Management (DSOM), Oct. 15-17, 2001, pp. 1-13.*

Malan, G. Robert and Jahanian, Farnam. "An Extensible Probe Architecture for Network Protocol Performance Measurement," Proceedings of the ACM SIGCOMM Conference on Applications, Technologies, Architectures, and Protocols for Computer Communication, 1998, pp. 215-227.*

Narten, T. et al. "Neighbor Discovery for IP Version 6 (IPv6)," RFC 2461, Dec. 1998, pp. 1-93.*

Deering, S. et al. "Multicast Listener Discovery (MLD) for IPv6," RFC 2710, Oct. 1999, pp. 1-22.*

Haberman, B. and Worzella, R. "IP Version 6 Management Information Base for the Multicast Listener Discovery Protocol," RFC 3019, Jan. 2001, pp. 1-15.*

Conta, A. "Extensions to IPv6 Neighbor Discovery for Inverse Discovery Specification," RFC 3122, Jun. 2001, pp. 1-20.*

Freed, N. and Kille, S. "Network Services Monitoring MIB," RFC 2248, Jan. 1998, pp. 1-19.*

McCloghrie, K. and Bierman, A. "Entity MIB (Version 2)," RFC 2737, Dec. 1999, pp. 1-56.*

Cozzani I et al.: "A Passive Test and Measurement System: traffic sampling for QoS evaluation" Global Telecommunications Conference, 1998, Globecom 1998. The Bridge to Global Integration. IEEE Sydney, NSW, Australia, Nov. 8-12, 1998, Piscataway, NJ, USA, IEEE, US, Nov. 8, 1998, pp. 1236-1241, XP010339722.

* cited by examiner

FIG_1
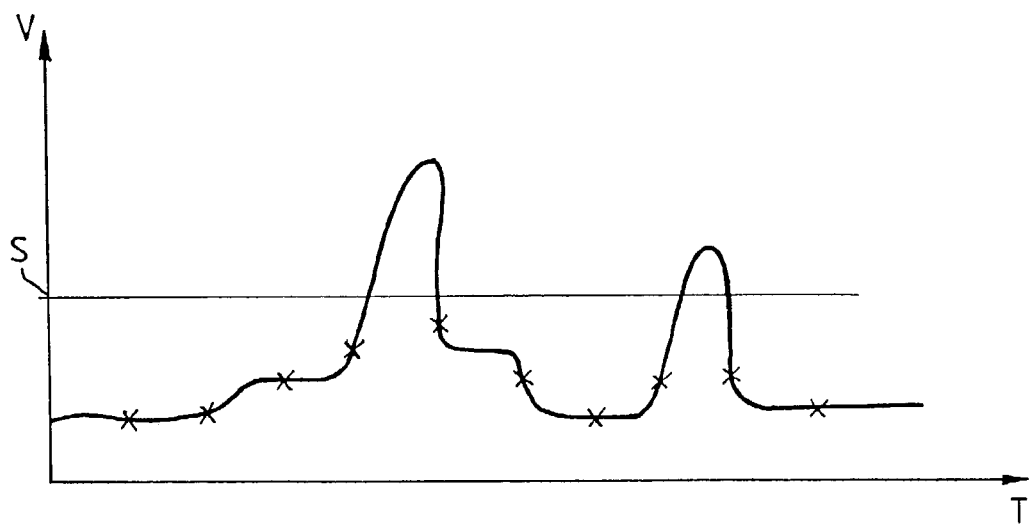
FIG_2
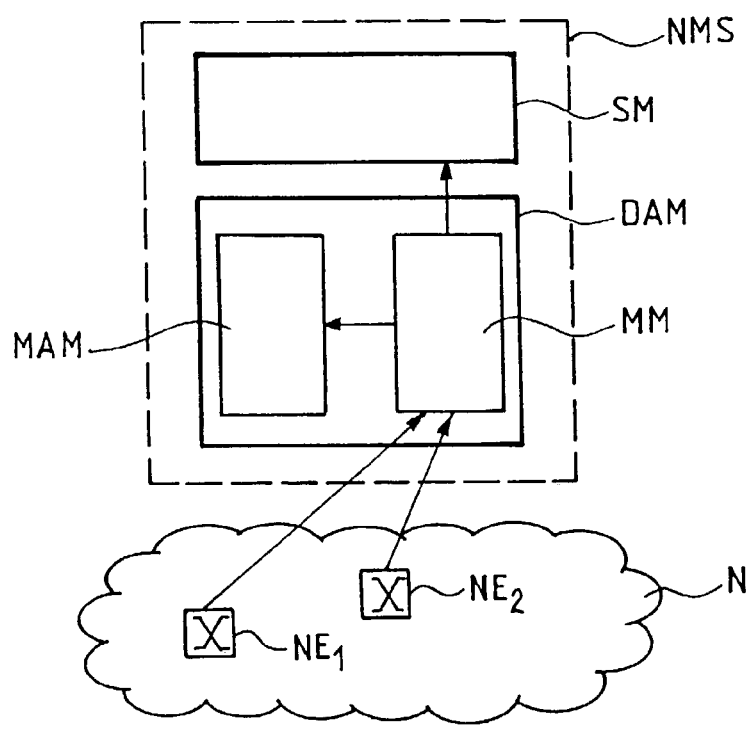

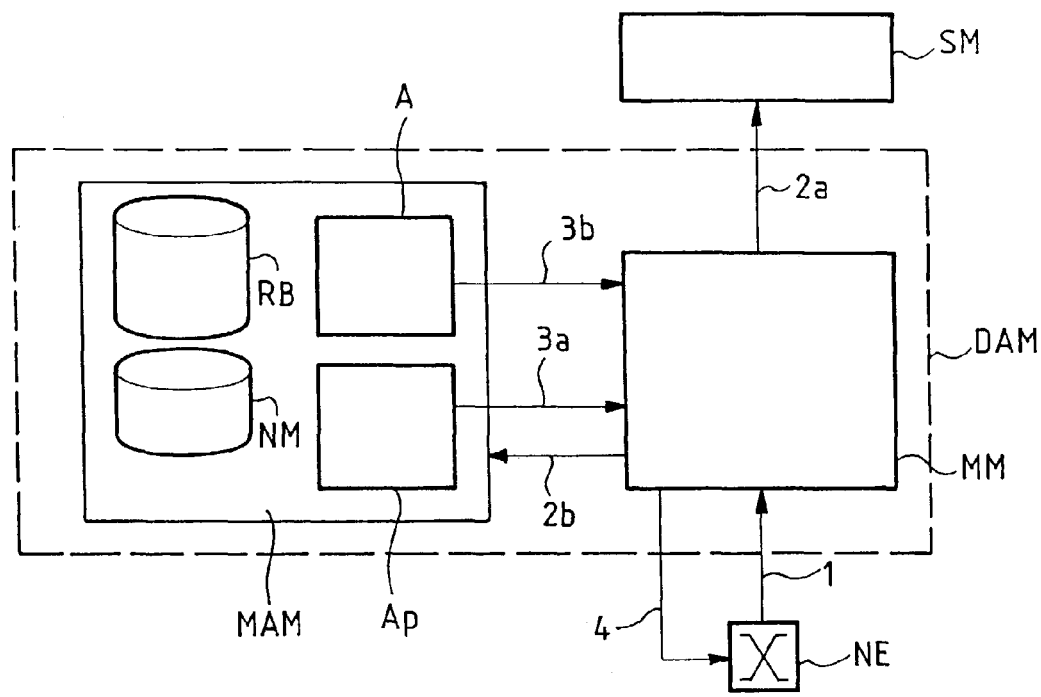
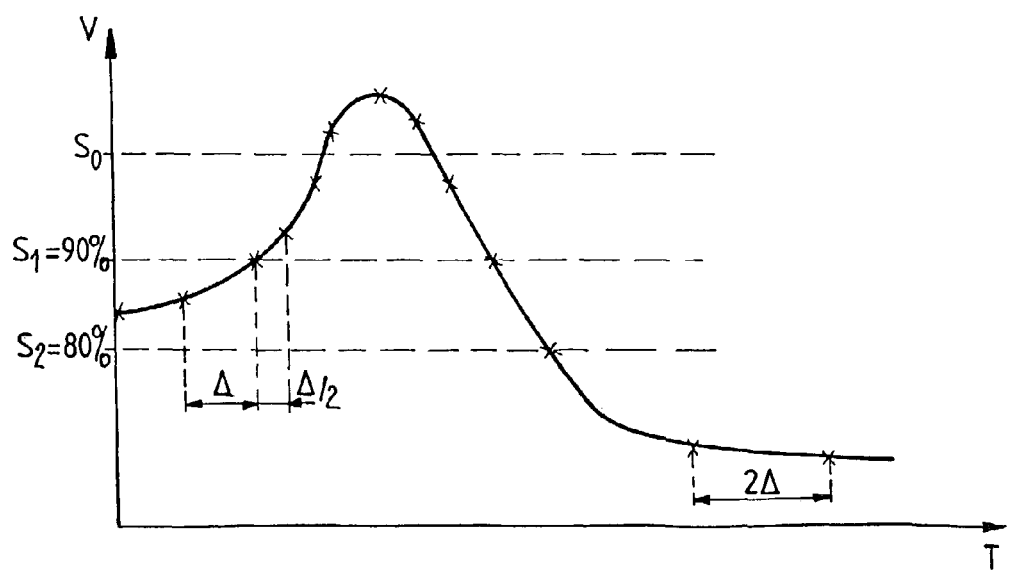

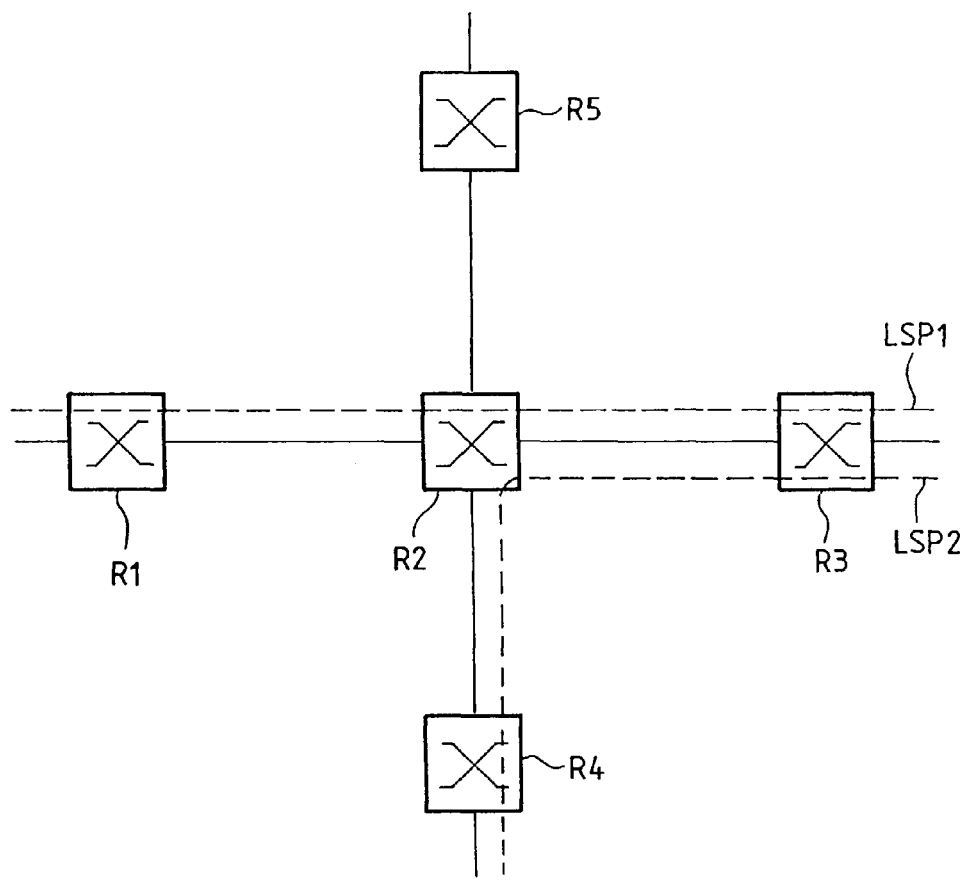
FIG_5

ADAPTIVE DATA ACQUISITION FOR A NETWORK OR SERVICES MANAGEMENT SYSTEM

The present invention relates to managing telecommunications networks and services. More precisely, it relates to acquiring data for the purposes of such management.

BACKGROUND OF THE INVENTION

In order to detect breakdowns or losses of performance within a telecommunications network, it is conventional to associate a network management system therewith.

The network management system has means for acquiring data coming from network equipment (routers, switches, repeaters, connections, etc.).

The data can constitute alarms or merely measurements.

Alarms are notified by a piece of network equipment when it has detected a problem (a deficiency, a value crossing a threshold, etc.).

Measurements are values transmitted by pieces of network equipment when there is no such problem situation. They can correspond to a "push" model, i.e. they can be transmitted on request from the network management system. Such transmission can be performed periodically.

They can also correspond to a "pull" model. Under such circumstances, the measurements are available in databases located at the pieces of network equipment. These databases are generally referred to as a management information base (MIB). The management system can then read these measurements by accessing the MIB databases.

On the basis of this data, the network management system is then required to detect any problems and to characterize them.

The network management system may also have the function of determining the impact of these problems on the services conveyed by the network and on the performance thereof.

In order to perform this function correctly, it is important for the network management system to have data available that satisfies constraints in terms of speed and accuracy.

The data is acquired by sensors positioned on all or some of the pieces of equipment in the network, and is then transited to the network management system.

Nevertheless, insofar as the number of pieces of network equipment to be monitored can be large, it is necessary to find a compromise.

It is penalizing to acquire all of the possible data about the network since that would overload:

- the network management system which would have to process all of the data;
- the monitored network itself (the data often being conveyed by the network's own communications means); and
- the monitored pieces of network equipment which need to perform processing in order to transmit measurements and alarms.

In contrast, the less data that is available to the network management system, the less capable it is of performing its function properly. In particular, if a data item available about some piece of network equipment is not measured sufficiently often, then the network management system can fail to detect that a threshold is exceeded. An example of such undersampling is illustrated by FIG. 1.

In FIG. 1, there can be seen a curve showing how a value V measured on a piece of network equipment varies as a function of time T. V can be the rate at which packets are lost, for example. The network management system associates a threshold S with this value and it is considered that an alarm needs to be triggered when the threshold is exceeded. The crosses represent measurement points.

It can clearly be seen that the curve can cross the threshold without that being detected, since all of the measured values (the crosses) lie beneath the threshold line S.

In the prior art, a compromise is therefore sought during the stage of configuring the network management system. The person in charge of configuring needs to determine where to place sensors, and where appropriate, the periodicity with which data needs to be acquired.

Nevertheless, such a solution is insufficient since it relies on the assumption that the network does not vary over time. In contrast, the Applicant is of the opinion that network variation leads to a loss of performance in network management systems in the present state of the art.

Network variation can be due to traffic variation or indeed to a change to the network itself (adding a piece of equipment to the network, dynamic reconfiguration of routing schemes, etc.).

One solution for solving that problem consists in placing an intermediate layer between the sensors and the network management system proper. The sensors are configured to acquire the maximum possible amount of data and to transmit it to the intermediate layer. The function of the intermediate layer is to filter and correlate the data so as to forward a usable fraction only to the network management system.

The network management system can modify the intermediate layer dynamically so as to modify filtering and correlation criteria as a function of how the network varies.

As an example of the state of the art, mention can be made of the "Temip" product provided by the supplier Compaq, or indeed any network management software based on a rules management product such as "Ilog Rules" from the supplier Ilog.

Nevertheless, that solution is not genuinely satisfactory.

Firstly, it requires additional processing to be added that is implemented in the intermediate layer. Since the intermediate layer acquires the maximum possible amount of data, the additional processing requires enormous processing resources.

It should also be observed that a good portion of this processing can be completely useless since it relates to data in which the network management system will take no interest at any given instant. The problem of network overload due to taking measurements remains.

Furthermore, that technique does not enable modifications to network configuration to be taken into account: if a piece of equipment is added to the network, it will not be taken into account by the network management system unless the network management system is reconfigured manually.

Another solution in the state of the art is described in the article "A passive test and measurement system: traffic sampling for QoS evaluation" by Irene Cozzani and Stefano Giordana, of the University of Pisa. The authors propose varying sampling rates so as to improve the pertinence of the data that is collected.

Nevertheless, such a solution does not solve all of the problems raised above. In particular, it does not solve those that might arise when a new element is added to the network, or when overloading (or more generally a problem) appears in a new location.

OBJECT AND SUMMARY OF THE INVENTION

The object of the invention is to solve those various problems by proposing a network management system capable of adapting its measurement system as a function of the measured data.

To this end, in a first aspect, the invention provides a network management system comprising a data acquisition module, itself comprising a measurement module for collecting data coming from probes placed on items of network equipment in a network, and for forwarding the data to a supervisor module, the data being collected as a function of measurement parameters associated with said probes. In the network management system, said data acquisition module further comprises a measurement adaptation module having means for adding or removing said probes and for modifying the associated measurement parameters as a function of the collected data.

In a second aspect, the invention provides a service management system comprising such a network management system.

BRIEF DESCRIPTION OF THE DRAWINGS

The invention and its advantages appear more clearly from the following description of an implementation given with reference to the accompanying figures.

FIG. 1, commented on above, illustrates the problem of undersampling as presented by certain prior art solutions.

FIG. 2 is a diagram of a network management system of the invention.

FIG. 3 is a detail view of the data acquisition module of the invention.

FIG. 4 shows an example of a rule that can be used by the parameter adaptation module.

FIG. 5 shows a portion of a data network made up of five routers.

MORE DETAILED DESCRIPTION

In this implementation, the network management system NMS comprises at least one supervisor module SM and a data acquisition module DAM.

The data acquisition module DAM receives data coming from probes (not shown) situated on items of network equipment $NE_1$, $NE_2$ in a network N. These probes transmit data as a function of measurement parameters such as, for example, a measurement period or frequency, an algorithm for averaging measurement data, the window over which said averaging should be performed, etc.

The data is initially received by a measurement module MM which transmits it firstly to the supervisor module SM and secondly to a measurement adaptation module MAM.

The supervisor module SM may be of the kind used in state of the art supervisor systems and serves to perform tasks that are conventional for such systems: alarm correlation, displaying a man-machine interface MMI, etc.

The measurement adaptation module MAM has means for acting as a function of the data:

to modify the measurement parameters of the probes placed on the items of network equipment; and to add or remove probes.

FIG. 3 is a detail view of a data acquisition module in an embodiment of the invention.

Initially, the measurement module MM collects data coming from probes placed on items of network equipment NE. The data is transmitted in the form of messages 1 which can be transmitted periodically or at the request of the measurement module MM.

As mentioned above, the measurement module then forwards the data it has collected firstly to the supervisor module SM by means of a message 2a, and secondly to the measurement adaptation module MAM by means of a message 2b.

The measurement adaptation module MAM is described in further detail. In this implementation, it comprises four co-operating modules:

a parameter adaptation module $A_P$;

a probe adaptation module $A_S$;

a network model NM; and a rule base RB.

The function of the parameter adaptation module $A_P$ is to modify probe parameters as a function of the data as collected and conveyed by the message 2b received by the measurement module MM. It can then transmit modified parameters by means of a message 3a to the measurement module MM. The measurement module in turn forwards these messages to the corresponding items of network equipment NE in messages 4.

The probe adaptation module $A_S$ serves to add or remove probes, as a function of the same collected data. It can then transmit information relating to such additions or deletions in messages 3b transmitted to the measurement module MM. As before, the measurement module can forward these messages to items of network equipment NE by means of the messages 4.

FIG. 4 shows an example of a rule that can be used by the parameter adaptation module $A_P$.

FIG. 4 shows how a value V for one of the data items collected varies as a function of time T.

The threshold $S_0$ represents the maximum limit which this value V can reach prior to it being necessary to trigger an alarm.

A measurement period is also defined which defines the spacing in time between successive measurements, as represented by crosses on the curve. This measurement period initially has a value $\Delta$.

When the curve crosses a threshold $S_1$, the measurement period is shortened by a certain shortening factor. This threshold may be equal to 90% of the threshold $S_0$, and the shortening may be by a factor of 2. The new measurement period then becomes $\Delta/2$.

This shortening of the measurement period $\Delta$ makes it possible to increase the accuracy of the knowledge possessed by the supervisor module SM concerning variation in the value V. This can make it possible to avoid missing a crossing of the threshold $S_0$ as occurs in the prior art solution explained above with reference to FIG. 1.

Conversely, when the value V drops back below the threshold $S_1$, the measurement period can return to its initial value $\Delta$.

A second threshold $S_2$ can also be defined so as to further improve the performance of the system of the invention. By way of example, this threshold $S_2$ can be defined as being 80% of the threshold $S_0$.

When the value V drops below the threshold $S_2$, the measurement period may be lengthened by a lengthening factor, for example to a value that is equal to $2 \times \Delta$.

This makes it possible to minimize loading of the network and of the measurement module MM. Such minimization is entirely acceptable whenever the value V being far away from the threshold $S_0$ means that the probability of V crossing the threshold is negligible.

A possible improvement to this algorithm is to cause the lengthening and shortening factors to depend on a disparity factor.

The disparity factor δ can be calculated as being a mean, e.g. the geometrical mean, of the differences between two consecutive measurements.

Thus, when the disparity factor is small, the lengthening or shortening factor can be made smaller. Conversely, when the disparity factor is large, then the lengthening or shortening factor can be increased.

FIG. 5 shows a portion of a data network made up of five routers $R_1$, $R_2$, $R_3$, $R_4$, and $R_5$.

Two virtual connections LSP1 and LSP2 have been set up:
the first virtual connection LSP1 passes via routers $R_1$, $R_2$, and $R_3$; and
the second virtual connection LSP2 passes via routers $R_4$, $R_2$, and $R_5$.

A simple rule which can be implemented consists in determining whether the load on each virtual connection does or does not exceed a predetermined threshold.

If the load on a virtual connection exceeds the threshold, then probes are placed on each of the routers contributing to said virtual connection (if they have not already been put into place).

Conversely, if the load drops back below the threshold (or some other threshold), then the probes are eliminated on the routers contributing to the virtual connection.

In an implementation of the invention, the rules governing the behavior of the parameter adaptation modules $A_P$ and the probe adaptation modules $A_S$ are stored in a rule base RB contained in the measurement adaptation module MAM.

Furthermore, the measurement adaptation module MAM may contain a network model NM so as to enable the rules to be inferred.

What is claimed is:

1. A network management system comprising a data acquisition module itself comprising a measurement module,
wherein said measurement module collects data coming from probes placed on items of network equipment in a network, and forwards the data to a supervisor module, the data being collected as a function of measurement parameters associated with said probes,
wherein said data acquisition module further comprises a measurement adaptation module, which receives the data from the measurement module, and
wherein said measurement adaptation module adds or removes said probes and modifies the associated measurement parameters as a function of the collected data.

2. A network management system according to claim 1 in which said measurement parameters are a measurement period.

3. A service management system comprising a network management system according to claim 1.

4. A network management system according to claim 1, wherein the probes are added if a load on a virtual connection of the network exceeds a predetermined threshold, and the probes are removed if the load on the virtual on the virtual connection is below the predetermined threshold.

5. A network management system according to claim 1, wherein a measurement period of the collecting of the data is shortened as a collection value approaches a predetermined threshold, and the measurement period is lengthened as the collection value moves away from the predetermined threshold.

* * * * *